May 3, 1966 P. W. BOLMER 3,249,522
ELECTROCHEMICAL OXIDATION OF HYDROGEN SULFIDE
Filed Feb. 23, 1965
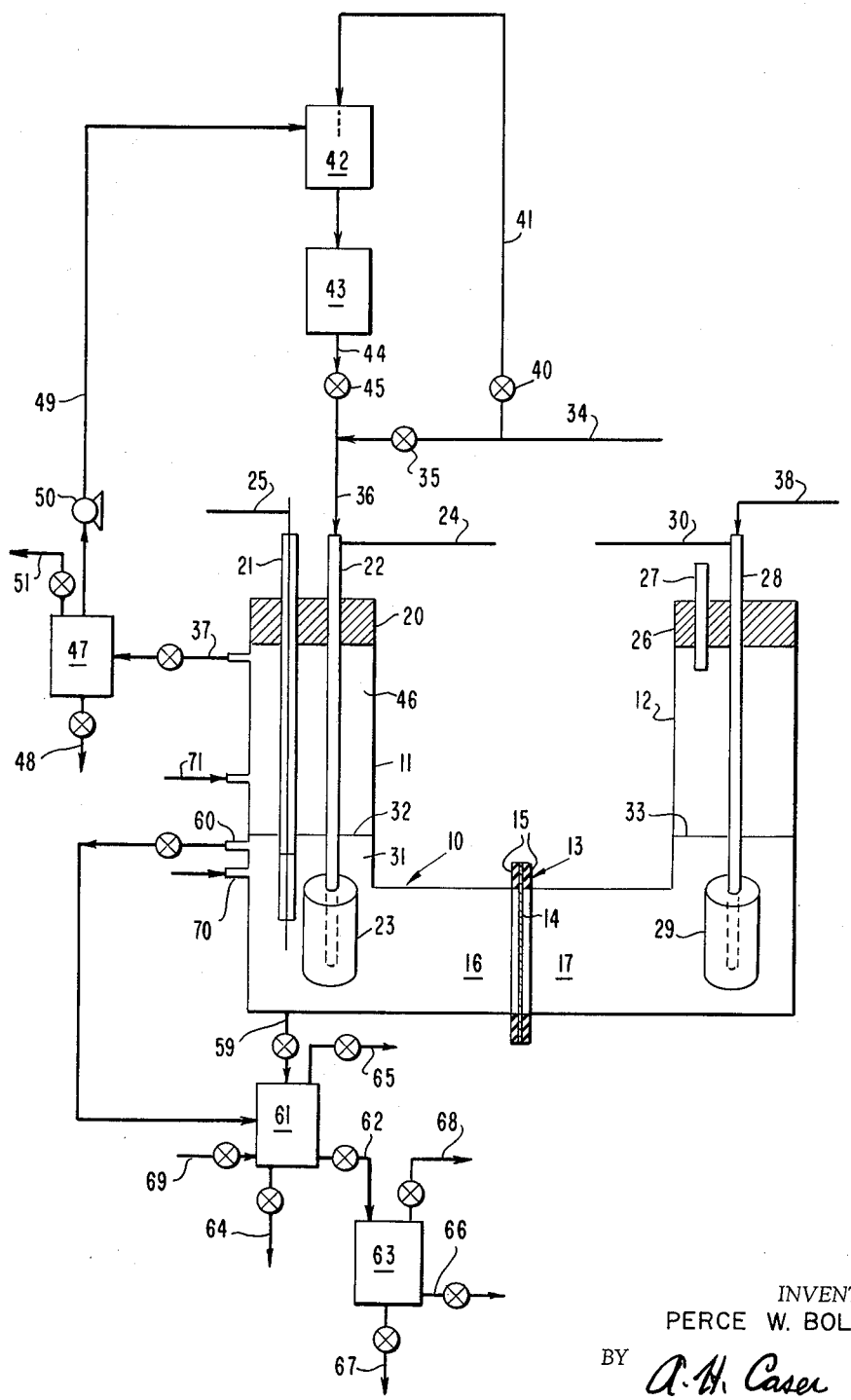
INVENTOR.
PERCE W. BOLMER
BY A. H. Caser
ATTORNEY

United States Patent Office 3,249,522
Patented May 3, 1966

3,249,522
ELECTROCHEMICAL OXIDATION OF
HYDROGEN SULFIDE
Perce W. Bolmer, Dallas, Tex., assignor to Socony Mobil
Oil Company, Inc., a corporation of New York
Filed Feb. 23, 1965, Ser. No. 434,533
11 Claims. (Cl. 204—92)

This application is a continuation-in-part of application Serial No. 145,777, filed October 17, 1961 and now abandoned.

This invention relates to the use of hydrogen sulfide as a raw material in electrochemical cells, and particularly to its consumption in such cells. More particularly, the invention relates to a process for the anodic oxidation of hydrogen sulfide to produce electric power and/or useful products wherein the activity of the anode is maintained in the presence of reactions which tend to deactivate it.

While not restricted thereto, the process of the invention is specially useful in the operation of a fuel cell in which hydrogen sulfide is employed as the fuel. From such process electric current is obtainable together with valuable products like sulfur, sulfides, and polysulfides, particularly tetrasulfides such as sodium tetrasulfide, $Na_2S_4$. A further advantage is that the source of hydrogen sulfide may be a low cost material such as a sour natural gas in which the presence of hydrogen sulfide is regarded as troublesome and from which its removal is usually required if the maximum economic value of either the natural gas or the hydrogen sulfide is to be obtained. A number of conventional removal methods are available and, of course, involve added expense. By contrast, the process of the invention operates to remove hydrogen from the gas stream containing it in the step of utilizing it as the fuel, thus securing at least two useful results from the single step of introducing the gas stream to the fuel electrode of a fuel cell. The hydrogen sulfide-depleted gas is removed from the fuel cell and used as desired.

The invention may be understood in connection with the accompanying drawing, which is diagrammatic, and which shows a fuel cell in simplified form and an associated flow system. It will be understood that the principles of the cell are of general application, particularly to cells grouped in batteries or packs and which are of a generally flat shape by virtue of having closely packed, interleaved cell elements. The cell, designated as 10, comprises anode and cathode compartments 11 and 12 joined together at 13 in a connection or joint comprising a diffusion barrier which may be in the form of an ion-exchange membrane 14. A gasket 15 of synthetic rubber or other suitable material is disposed on each side of the barrier to provide a tight seal between the barrier and the adjoining portions 16 and 17 of the cell.

The anode compartment 11 is sealed at its upper end by an apertured plug 20 through which extends a reference electrode 21 and a tube 22 of stainless steel or other suitable material. At its lower end tube 22 fits into a porous cylindrical anode or fuel electrode 23 which suitably comprises porous carbon. The bore of the cylinder 23 opens only through the top to receive the tube 22, and the latter may be sealed to the cylinder as by means of a conducting cement no shown. The tube and cement may be protected against electrolyte attack by a resistant coating like an epoxy resin not shown. Tube 22 serves as the fuel gas inlet to the electrode and as an electron conductor. A conducting wire 24 is connected to the tube and joins the same to an external circuit not shown, and at 25 a wire is shown for the reference electrode 21.

Cathode compartment 12 is also sealed by an apertured plug 26 through which a vent tube 27 and a tube 28 extend, the latter being like the tube 22. Tube 28 fits into a porous cylindrical cathode or oxygen electrode 29 comprising porous carbon, the bore of which opens through the top to receive tube 28. The joint between the tube and the cylinder may be sealed as described and both tube and joint protected by a resistant coating. Tube 28 introduces an oxidant such as oxygen or air to electrode 29 and also serves as an electron conductor. The tube is connected by a wire 30 to the external circuit. Excess oxidant is removed through vent 27 and may be recycled or disposed of in any suitable way.

It will be understood that the porous carbon of each cylindrical electrode may have impregnated thereon and therein a suitable catalyst; thus, the anode may have a conventional fuel electrode catalyst such as platinum, and the cathode may have a conventional oxygen electrode catalyst such as nickel.

The electrode compartments contain an aqueous alkaline electrolyte 31 which fills each compartment to a suitable level such as indicated at 32 and 33. Illustrative electrolytes may range in basicity from that of an aqueous one molar solution of sodium bicarbonate to that of an aqueous solution of 50% caustic soda.

In operation of the fuel cell, hydrogen sulfide fuel gas from a source not shown is introduced to tube 22 by line 34, valve 35, and line 36, the gas diffusing through the porous anode 23 to a three-phase contact zone or area in the electrode adjacent the electrolyte which involves the electrolyte, the electrode, and the gas. In this zone or area, and considering aqueous sodium hydroxide to be the electrolyte, anodic oxidation of the gas takes place, the equations for which may be written as follows:

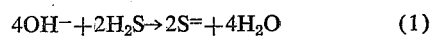

$$4OH^- + 2H_2S \rightarrow 2S^= + 4H_2O \qquad (1)$$

$$2S^= \rightarrow S_2^= + 2e^- \qquad (2)$$

The hydroxyl ions come from the electrolyte. Sulfide ions are produced which form disulfide ions with the production of electrons, and these are conducted by the electrode 23 and tube 22 to the external circuit, while the sulfide and disulfide ions and the water pass into the electrolyte. Any unreacted hydrogen sulfide passes out of compartment 11 through line 37.

At the cathode, oxygen from a source not shown is introduced to tube 28 by line 38, the gas diffusing through the porous cathode 29 to a three-phase contact area comprising the electrode, the electrolyte and the gas itself. An electrochemical reaction takes place in this area comprising the cathodic reduction of the oxygen, the equation being:

$$O_2 + 2H_2O + 4e^- \rightarrow 4OH^- \qquad (3)$$

The water is supplied by the electrolyte, and the electrons come from the external circuit, being supplied by the oxidation reaction at the anode.

It will be seen from the anode and cathode reactions that electrons are produced at the anode and consumed at the cathode, and on their journey through the external circuit may be made to do useful work. The overall chemical reaction may be written as follows:

$$H_2S + \tfrac{1}{2}O_2 \rightarrow S + 2H_2O \qquad (4)$$

In Reaction 4 the sulfur product may be in the form of various ionic sulfur species which may react to form desirable products like free sulfur, tetrasulfide, etc. It may be noted that the cell is operated at room temperatures and above.

As indicated by Reactions 1 and 2, the electrolyte solution in the vicinity of the anode, i.e., the anolyte, contains sulfide and disulfide ions, among others. By variation of the electrolyte, especially by varying its pH, it is possible to form valuable products in the anolyte, although for this purpose certain provision should be made. Thus, when free sulfur is formed as product, it is found that the finely divided precipitate of sulfur may enter the pores of the anode and inactivate it, causing an increase in the anode polarization and an increase in the resistance across the anode-electrolyte interface. To provide against such losses, and to counteract them, it is proposed to leach the anode surfaces with a solvent for the sulfur. Such leaching may be done intermittently, or as is preferred, continuously and coincidently with the production of electricity.

Referring to the drawing, a preferred way for leaching is to partially divert the flow of fuel gas in line 34 by closing valve 35 and opening previously closed valve 40 so that the gas may flow in line 41 to a sulfur solvent reservoir 42 containing a sulfur solvent such as benzene. The gas picks up some benzene, forming a mixture comprising gaseous hydrogen sulfide, benzene in the form of droplets in the liquid phase, and droplets of benzene having hydrogen sulfide dissolved therein. This mixture leaves the reservoir to flow through a heater 43 where the mixture is heated but not vaporized, after which it flows by line 44 and the open valve 45 into line 36, where it is joined by non-diverted fuel gas, and the resulting mixture flows into the tube 22 to the anode 23. The anode and the electrolyte in which it is immersed are maintained at a temperature above the boiling point of the solvent, so that as the mixture enters the pores of anode 23 and diffuses therethrough, the benzene is vaporized by the heat of the anode and boils off from the outer surfaces of the anode into the anolyte, coincidently dissolving deposited sulfur and removing the same as it boils off the said surfaces. Dissolved hydrogen sulfide is evolved as the benzene is heated by the anode, and it and the already gaseous hydrogen sulfide are electrochemically oxidized at the anode, but the solvent is not. As benzene vapors with their burden of dissolved sulfur pass through the anolyte, such sulfur dissolves in the anolyte to form sulfides and polysulfides, although if the anolyte is saturated with sulfur, then sulfur precipitates therein. The solvent vapors thus freed of sulfur bubble up through the anolyte into the space 46 and out of the compartment through line 37. The mixture may enter a zone 47, which suitably may comprise a fractionation zone for effecting separation of the benzene from any sulfur still remaining therein, the latter being recovered as a product through line 48, while the benzene is pumped by pump 50 through line 49 to the reservoir 42. If the benzene in line 37 is substantially free of sulfur, as is preferred, it is simply condensed in zone 47 and passed to reservoir 42. Some unreacted hydrogen sulfide may accompany the recovered benzene and will be stored with it in reservoir 42 in dissolved form, but as this mixture is to be reused, the gas can be left in the benzene.

It will be understood that the anode is heated by its immersion in the electrolyte, which is heated by means not shown to a suitable temperature greater than the boiling point of the solvent.

Another suitable method for introducing solvent to the anode is like that just described except that the solvent is vaporized in heater 43. Combined solvent vapors and hydrogen sulfide gas then flow by line 44, open valve 45, and line 36 into the tube 22 and then to the porous anode 23 where the gaseous mixture diffuses through, the fuel being oxidized and the solvent vapors dissolving any sulfur in the anode pores. As solvent and dissolved sulfur flows through the anolyte, the sulfur is stripped from the solvent, the latter then bubbling up through the anolyte to be removed through line 37. Still another method for introducing solvent comprises flowing the fuel gas through line 34, open valve 35, and into line 36 where it is joined by solvent vapors coming from heater 43, line 44, and the open valve 45. In this case there is no diversion of fuel gas into line 41. The flow of the solvent vapor-fuel gas mixture is as just described.

It should be noted that the hydrogen sulfide flow rate to the anode will usually be sufficient to permit substantially all of the gas to be reacted, so that the amount of unreacted gas passing out of the cell will not be substantial. In some cases, however, it may be desirable, as to avoid corrosion problems, to remove such gas so that substantially pure solvent is stored in the reservoir 42, and for this purpose the material in zone 47 may be subjected to an initial stripping step to remove hydrogen sulfide from the solvent, the gas being removed by line 51 and passed by means not shown to the inlet line 34. The solvent in zone 47 is treated as described above.

In regard to the sulfur solvent, any suitable material is useful, but preferably one that is vaporizable under the conditions of operation. Low boiling cyclic hydrocarbons, such as aromatics like benzene and toluene, and cycloparaffins such as cyclopentane and cyclohexane, and their lower alkyl derivatives, are useful solvents. Other solvents include carbon disulfide, ammonia, aqueous or alcoholic solutions of ammonia, ammonium sulfide. To insure its vaporization, if it is normally liquid, the solvent preferably has a boiling point slightly less than the temperature of operation of the fuel cell; for example, a cell operated at 85° C. may suitably employ benzene, B. 79.6° C.; a cell operated at 50° C. may use carbon disulfide, B. 46.3° C.; and a cell operated at room temperature may use ammonium sulfide, a compound which at higher temperatures tends to decompose. In the case of solvents that are not electrolytes, it is desirable to remove them from the anolyte as rapidly as is practical, and this is suitably done by using easily vaporizable compounds. The solvent may or may not dissolve the hydrogen sulfide.

Accordingly, by solvent leaching of the anode, either periodically or continuously, the anode surface may be kept clear and in a state of activity. Operation of the cell to produce electricity and valuable products can then take place, the products being recovered by removing anolyte by line 60, separating the same in zones 61 and 63, recovering products, and returning anolyte and unreacted fuel to the cell for reuse.

To form polysulfide products, the pH of the electrolyte is raised to a value preferably in the strongly alkaline range, as by introducing a solution of caustic soda by lines 70 or 71. Sulfide and other ions are formed, together with electricity, as indicated by Reactions 1 and 2, and some sulfide ions are oxidized to free sulfur while some react with the caustic soda-reinforced anolyte to form polysulfides. The free sulfur is desirably allowed to remain in the anolyte as it dissolves therein to form polysulfides. For example, sulfur, S, dissolves in a sulfide solution, S=, to give a polysulfide, $S_x^=$. The latter may react further as follows:

$$S_x^= + H_2S \rightarrow HS_x^- + HS^- \qquad (5)$$

$$HS_x^- + HS^- \rightarrow S_{x+1}^= + 2H^+ + 2e^- \qquad (6)$$

Depending on the value of $x$ in these reactions, various polysulfides, including the tetrasulfide, may form in the anolyte as a result of Reactions 5 and 6. In general, when the anolyte is strongly alkaline, $S_x^=$ is a usual ionic sulfur species, and products such as $Na_2S_2$, $Na_2S_4$, and free sulfur may form in the anolyte. In order to form the tetrasulfide, the preferred pH is 14 or greater, preferably obtained by means of aqueous caustic soda or sodium sulfide solutions of 1 to 10 molar concentration, which, desirably, are continuously fed to the anolyte compartment through lines 70 or 71 or both at a suitable rate. With continuous introduction of these alkaline solutions, continuous removal of anolyte is possible in order to recover the product. Aqueous ammonium hydroxide solutions are also of value for forming polysulfides. In anolytes which are mildly or weakly alkaline, HS⁻ is the usual sulfur species, and the anolyte product tends to be free sulfur.

It should be observed that polysulfide products also have a tendency to precipitate out and to deposit on the anode surfaces, but such tendency can be taken into account by introducing caustic soda through lines 70 or 71 to dissolve and so keep the polysulfides in solution. Any such products on the anode surfaces which do not dissolve in the anolyte may be removed by solution in the sulfur solvent which is diffused through the anode and which, preferably, boils off its exterior surfaces.

A recovery procedure for the polysulfides comprises withdrawing portions of the anolyte through line 60 and delivering the same to the separating zone 61. In the latter, the anolyte mixture, if it contains free sulfur, may be filtered to remove the same, the filtrate passing by line 62 to zone 63, and the sulfur being removed by line 64. The polysulfide product comprises the filtrate in zone 63 and may be recovered through lines 66 or 67 for any appropriate use. When the cell operation is conducted to favor formation of tetrasulfide in the anolyte, as by operating at an anolyte pH of 14 or greater and introducing a sufficient amount of caustic soda by lines 70 or 71, the material in zone 63 will comprise an aqueous solution of sodium tetrasulfide. Adjustments may be made in its concentration, as by increasing its tetrasulfide content, or decreasing it by adding water. In a battery or pack of cells, it is advantageous to pass the anolyte from one cell through one or more other cells in series and thus secure an increased tetrasulfide concentration as may be desired. Tetrasulfide in the form of a 40% aqueous solution is desirable for commercial sale.

It will be understood that during operation of the process to form any of the foregoing products, the fuel cell may be, and preferably is, operated to produce electric current which will suitably be used in an appropriate external circuit, not shown. If desired, and especially in the case of tetrasulfide products, the cell operation (to produce current) may be momentarily interrupted long enough to withdraw the desired tetrasulfide-containing anolyte through line 60, and to replenish the anolyte supply by introducing fresh anolyte through lines 70 or 71.

A desirable procedure for producing free sulfur comprises using ammonium hydroxide as the anolyte, which forms ammonium polysulfide. Anolyte containing the latter compound is removed through line 60 to zone 61 and heated therein by means not shown to precipitate sulfur and to drive off ammonia and hydrogen sulfide gases, leaving behind an ammonia solution. The two gases are removable from zone 61 through line 65 and may be passed by means not shown to the fuel feed line 34 for reuse of the hydrogen sulfide. The ammonia solution containing precipitated sulfur may be removed through line 62 to zone 63 and filtered therein by means not shown. The ammonia solution may be withdrawn through line 66 and recycled to the anolyte compartment, and the sulfur removed through line 67 and recovered as product.

Another procedure for producing free sulfur comprises using aqueous sodium carbonate solution as the anolyte. The anolyte containing dissolved polysulfides is removed through line 60 to zone 61 where free sulfur may be precipitated by sweeping the solution with carbon dioxide gas, introduced by line 69 and vented through line 65. The remaining solution plus the precipitated sulfur may be passed by line 62 to zone 63 where it may be reheated to drive off excess carbon dioxide, this being removed through line 68. The mixture may then be filtered in the same zone and the solution recirculated to the anolyte compartment by line 66 and other means not shown. Precipitated sulfur is removable by line 67 and recovered.

It will be understood that zones 61 and 63 are capable of flexible use, and may contain one or a plurality of units for filtering, heating, and the like.

Sulfur preciptiated in the anolyte compartment 11 is preferably allowed to dissolve in the anolyte to form polysulfides, but if its removal is desired, this is done through line 59 and the sulfur is recovered by filtration in zone 61.

Considering the operation of the cell primarily from the view of producing electric current, it may be observed that current densities of up to 50 a.s.f. of electrode surface at cell voltages of about 0.3 to 0.7 volt, more or less, and efficiencies of up to about 50% (based on the maximum open circuit potential in alkaline solution) are obtainable. These results are with alkaline electrolytes ranging in basicity from that of a 1 molar aqueous sodium bicarbonate solution to that of a 10 molar aqueous caustic soda solution, using conventional available electrodes. Thus, cathodes are available having a polarization of no more than 0.2 volt in alkaline solutions at about 30° C., while anodes are available having only a slight polarization, much less than that of the cathode. The cell is operable at a temperature range from room to about 180° C., being heated by means not shown, and at pressures sufficient to keep the electrolyte in the liquid phase. Cell lifetimes may range to several hundreds of hours. With respect to other characteristics, open circuit voltages may range from 0.5 to 0.9 volt and electrolyte resistance may be as low as 0.5 ohm or less.

The hydrogen sulfide flow rate should be sufficient to satisfy current demand. The rate is variable from values below to values in excess of such demand; in the former case the current output is decreased, and in the latter the excess gas simply evolves from the anode into the anolyte and is removed through line 37. The numerical values of the flow rate depend on the cell size, current demand, and other factors. With the cells employed herein, flow rates of the order of 1 to 5 cc./min. were used, but as will be understood, these values are illustrative.

As indicated, the hydrogen sulfide fuel gas may be in a pure form or may be mixed with other components as in the case of sour natural gas which comprises mainly hydrocarbons like methane. Other gaseous hydrogen sulfide-containing fractions or mixtures are suitable, including coal gas, coke oven gas, gaseous petroleum fractions such as L.P. gas, refinery oil gas, etc. The presence of hydrocarbons, oxygen, carbon monoxide, or nitrogen in the mixture can be tolerated provided of course that the hydrogen sulfide content is sufficient for the current demand. When mixtures are employed, it is preferred to use those having little or no carbon dioxide in order to avoid changes in the pH of the electrolyte, although mixtures having large quantities of carbon dioxide can be pretreated to reduce the content of such gas. With any of the foregoing feeds, particularly those having at least 10%, and going up to 100%, of hydrogen sulfide, the invention is capable of selectively removing the hydrogen sulfide content thereof, thus producing electric current, valuable by-products, and a hydrogen sulfide-free gas mixture which may be useful as conventional fuel or for other purposes. Recycling of high hydrogen sulfide-containing gas mixtures is possible.

The electrodes are preferably porous cylindrically shaped bodies of the type shown, that is, having a central bore which opens through one end with provision for introducing gas to the bore so that it may diffuse laterally through the electrode. The electrodes may have various shapes, including disc and plate type devices. Porous carbon is a preferred electrode material, although others comprise screens, gauzes, mesh, grids, and the like of various metals such as titanium, nickel, stainless steel, and the like. The porous carbon or metal screen may have disposed or impregnated thereon a conventional fuel electrode catalyst such as one or more metals of Groups Ib, Vb, VIb, and VIII of the periodic table. For oxygen electrodes the support may carry one or more conventional catalysts such as gold, silver, platinum, palladium, rhodium, iridium, transition metal oxides, and the like. The periodic table classifications as used herein are based on the arrangement distributed by E. H. Sargent & Co. and further identified by the legend "Copyright 1962 Dyna-Slide Co."

While electrodes of the flow-through type are preferred, it is possible to use electrodes in which the fuel flow is along one side. In other words, the pores of such electrodes do not extend through from one side to the other but are disposed only in one side or surface. In such case the fuel and the electrolyte are mixed together before being introduced to the porous side of the electrode. The presence of the diffusion barrier prevents intermingling of the fuel and the oxidant.

Activation of the electrodes is a useful procedure. It may be carried out in the case of carbon by heating the carbon for about 3 to 6 hours at about 950° C. in an atmosphere of carbon dioxide. The support may then be impregnated with catalyst as by saturating it in a 20% aqueous solution of the nitrate of the catalyst metal followed by drying at about 120° C. and by a 2 to 3-hour heating step at about 600° C. or more in an atmosphere of hydrogen to deposit the metal on the support.

In this connection, it will be understood that carbon alone may be used as the electrodes; that is, it need not necessarily be impregnated with catalyst as the hydrogen sulfide is a sufficiently reactive compound. The use of catalysts, however, is preferred.

The electrolyte is an aqueous alkaline solution which has the basicity described. In terms of pH, the electrolyte may have a value ranging from pH 8.5 to about pH 15. Suitable compounds include sodium sulfide, sodium carbonate, sodium phosphate, sodium mono- or dihydrogen phosphate, caustic soda, sodium bicarbonate, sodium bisulfate, and the like. Ammonium compounds corresponding to the foregoing sodium compounds are of value, especially, ammonium hydroxide. Also useful are solutions of corresponding potassium compounds, particularly potassium hydroxide solutions of 1 to 15 molar concentration. The use of potassium compounds provides electrolytes of decreased resistance. For purposes of description the foregoing compounds may be described as alkaline compounds of a cation selected from the class consisting of sodium, potassium, and ammonium. The compounds are soluble in water to provide a basicity as already described. In terms of pH, the compounds are capable of producing aqueous solutions having a pH of 8.5 to 15.

Of interest is the fact that the presence of ferric ion in the catholyte acts to decrease the cathode polarization and/or increase cathode life. Ionizable compounds supplying ferric ions are soluble in the alkaline electrolyte and may include such compounds as potassium ferricyanide, ferric nitrate, ferric sulfate, and the like in concentrations of about 2 p.p.m. to saturation.

The diffusion barrier at 14 prevents intermingling of the gases supplied to the anolyte and catholyte and also prevents sulfide ions from leaving the anolyte. In other words, the barrier keeps sulfide ions out of the catholyte but permits hydrogen ions to pass from the anolyte to the catholyte; and it keeps hydrogen sulfide out of the catholyte and the oxidant out of the anolyte. It may be noted that in practice the path of flow through the barrier is desirably as short as possible; in respect of this feature it will be understood that the drawing is exaggerated. The barrier is preferably a conventional ion exchange membrane of which several types are available. Preferably the membrane is a cation exchange membrane of conventional type and is as thin as practical, ranging from 0.001 to 0.5 inch; it may be formed from an ion exchange resin by casting the latter into the form of a sheet, or by incorporating granules of the resin in a matrix comprising a binder such as polyethylene. A useful membrane has a permselectivity of about 0.9 and a conductivity of at least 100 millimhos per sq. centimeter, these values being illustrative. Other diffusion barriers may be made of carbon or porous plastic but are less preferred.

It may be observed that polysulfides are of interest for making sulfide dyes and in organic syntheses. Sodium tetrasulfide is of further interest in the manufacture of polysulfide resins and rubbers, being reactable with organic dihalides such as 1,2-dichloroethane to form polysulfide polymers.

The invention may be illustrated by the following examples, the first of which demonstrates that free sulfur on the anode results in decreased current, and that by introducing a sulfur solvent like benzene to the anode and boiling the same off its surfaces, the sulfur is removed with a consequent increase in current. The second example comprises a study of the short term polarization of the anode and shows how it and also cell resistance may be decreased by leaching the anode surfaces with boiling benzene.

Example 1

A half-cell was set up comprising a carbon anode disposed in electrolyte comprising a one molar aqueous solution of sodium hydroxide. The anode was made from Stackpole No. 139 porous carbon in the form of a cylinder having a bore of ¼ inch and one open end and one closed end. The anode was 2.54 cm. long by 1.9 cm. O.D. and had an approximate surface area of 20 sq. cm. The electrical contact and gas inlet to the anode were both made by means of a stainless steel tube set into the open end of the anode and sealed thereto by means of a plastic conducting cement.

With the electrolyte heated to 60° C., excess hydrogen sulfide was passed to the anode, and the anode potential was measured and held at +0.59 volt vs. a silver wire reference electrode. The current density was 360 ma. per sq. cm. and declined slowly. Small additions of benzene to the bore of the anode caused a further drop of current density. Then the temperature was increased gradually to 80° C. so that the benzene boiled from external surfaces of the electrode, and the current increased to about 300 ma., the anode potential being about +0.40 volt vs. silver. Free sulfur was then added until an excess was present in the anolyte, and the current density fell abruptly; when it reached about 95 ma., small (about ½ cc.) successive additions of benzene were made and the current increased to 350 ma.

Example 2

A half-cell was set up as in Example 1 except that the electrolyte was an aqueous 5 molar solution of sodium hydroxide. After allowing the electrolyte to stand to reach equilibrium with hydrogen sulfide maintained at 1 atmosphere thereover, it was saturated with sulfur at 85° C. Anode polarization was determined, using a lead reference electrode, and the following data were obtained:

| Current Density, ma./sq. cm. | Anode Potential, Volt | Current Density, ma./sq. cm. | Anode Potential, Volt |
|---|---|---|---|
| 0 | −0.1 | 17.5 | +0.21 |
| 2.5 | +0.02 | 20 | +0.23 |
| 5 | +0.06 | 22.5 | +0.26 |
| 7.5 | +0.09 | 25 | +0.29 |
| 10 | +0.12 | 27.5 | +0.32 |
| 12.5 | +0.14 | 30 | +0.34 |
| 15 | +0.17 | 32.5 | +0.37 |
|   |   | 35 | +0.39 |

When plotted, the foregoing data produces a potential-current curve which is nearly linear; most of the increase in potential is attributed to the IR drop within the cell. Immediately after the foregoing run, the cell resistance was 3.3 ohms. A constant current of 100 ma./sq. cm. was applied, and the anode potential increased to about 5 volts in 15 minutes and the cell resistance increased to about 15 ohms. Small successive additions of benzene reduced the anode potential to 0.045 volt with 100 ma./sq. cm. flowing. Then a constant current of 400 ma./sq. cm. was applied, and the potential was kept at about 0.2 volt by means of benzene additions, the cell resistance dropping to 2.6 ohms. The cycle of high anode polarization (about 5 volts) without benzene additions and low polarization (about 0.05 to 0.2 volt) with benzene additions was repeated four times over an 8-hour period. The benzene vapor issuing from the cell was condensed and recycled through the anode.

Any suitable means may be employed to maintain the anode and anolyte at operating temperature. As indicated, a preferred way is to heat the anolyte, as by means of a suitable electrical heating coil immersed therein, and the anolyte in turn heats the external surfaces of the anode by contact therewith, thus insuring that such surfaces will always be at a temperature above the boiling point of the solvent so that the solvent boils off therefrom.

Continuous operation is preferred as it provides continuous power and continuous formation of tetrasulfide or other products. Batch operation is feasible, particularly where the cell or cells are large, contain a plurality of anodes in parallel, and contain a large volume of anolyte. Of interest in this connection is that in a cell having two or more anodes, leaching of anode surfaces may be carried out on an anode which is not working, i.e., is cut out of the circuit while one or more other anodes are active in the oxidation of fuel and production of current. When the first anode is activated, or freed of deposited sulfur, it may be cut back into circuit and another cut out and leached.

It will be understood that any desired number of cells 10 may be used to form a pack or battery of cells. Fuel gas and solvent may be fed to the anode of each cell, oxygen-containing gas to each cathode, caustic soda or other alkaline compound to each anolyte compartment, and anolyte may be removed from each anolyte compartment and combined and processed for recovery of sulfur or polysulfide products.

While aqueous electrolytes are preferred, at least some of the advantages of the invention are obtainable with non-aqueous electrolytes, such as a mixture of an alkanolamine with a tetraalkylammonium chloride, e.g., ethanolamine with tetramethylammonium chloride, or a mixture of an acylamide with an alkali metal hydroxide, e.g., acetamide with potassium hydroxide.

It will be understood that the invention is capable of obvious variations without departing from its scope.

In the light of the foregoing description, the following is claimed:

1. An electrochemical method of oxidizing hydrogen sulfide in a fuel cell to produce electric power and at least one by-product, wherein said cell has a porous fuel electrode and an oxygen electrode in contact with an alkaline electrolyte, that portion of the electrolyte in which the fuel electrode is immersed being hereafter referred to as anolyte, which comprises employing as said electrolyte an aqueous solution of an alkaline compound having a basicity ranging from that of a 1 molar sodium bicarbonate solution to that of a 10 molar caustic soda solution, the cation of said alkaline compound being selected from the class consisting of sodium, potassium, and ammonium, introducing to the fuel electrode hydrogen sulfide and a liquid phase sulfur solvent while coincidently introducing to the oxygen electrode an oxidant, maintaining said fuel electrode and anolyte at a temperature in the range of room to about 180° C. and a pressure sufficient to maintain the anolyte in liquid phase, selectively electrochemically reacting the hydrogen sulfide at the fuel electrode to produce electric current and ionic sulfur species including sulfide ions, reacting in the anolyte a portion of said sulfide ions with said alkaline compound to form an alkaline polysulfide, another portion of said sulfide ions undergoing reaction to form sulfur which tends to deposit on external surfaces of the fuel electrode, said solvent having a boiling point just below the temperature of said fuel electrode and anolyte and being heated by contact with the fuel electrode so that the solvent boils off from external surfaces thereof into the anolyte, thereby to continuously wash said surfaces to dissolve any free sulfur deposited thereon, dissolving in the anolyte the free sulfur content of said solvent during passage of the latter from said fuel electrode through the anolyte, removing sulfur-depleted solvent from the cell, withdrawing anolyte, and recovering therefrom said alkaline polysulfide.

2. Method of claim 1 wherein said anolyte has a basicity equivalent to that of a 1 to 10 molar solution of caustic soda and a pH of at least 14, maintaining said basicity and pH during operation of the cell by introducing to the anolyte additional quantities as needed of said alkaline compound, thereby to form alkaline tetrasulfide, removing anolyte from said cell and recovering therefrom said tetrasulfide.

3. In an electrochemical method of oxidizing hydrogen sulfide in a fuel cell to produce electric power wherein said cell has a porous anode immersed in an alkaline anolyte and a cathode immersed in an alkaline catholyte, and wherein free sulfur forms in the anolyte and deposits on surfaces of said anode, the step of removing said sulfur from said surfaces which comprises flowing hydrogen sulfide fuel gas, prior to introduction of the same to the anode, through a body of liquid solvent for sulfur, thereby to entrain droplets of solvent in the gas, said solvent boiling at a temperature less than the temperature of operation of said cell, maintaining said anode and anolyte at cell operation temperature, flowing the mixture of fuel gas and solvent to the anode for electrochemical oxidation of said gas to produce electric current and coincidently therewith to form sulfur at least a portion of which deposits on said anode, heating said solvent as it makes contact with the anode and vaporizing the same from surfaces thereof into the anolyte, said solvent vapors dissolving deposited sulfur and removing the same from said surfaces, stripping said sulfur from the solvent by means of the anolyte, and removing sulfur-depleted solvent from the anolyte.

4. In the operation of a hydrogen sulfide fuel cell having a porous anode and a cathode immersed in an electrolyte, the step of reducing anode polarization resulting from deposition of sulfur on the same which comprises adding a sulfur solvent to the hydrogen sulfide feed gas and introducing the resulting mixture to the anode, electrochemically oxidizing the hydrogen sulfide at the anode to produce electrons, sulfide ions, and eventually an amount of free sulfur a portion of which deposits on the anode, maintaining the anode at a temperature greater than the boiling point of the solvent so that the latter vaporizes from the anode, and thereby dissolving deposited sulfur in the solvent and removing the same from said anode.

5. Method of claim 4 wherein said electrolyte has a basicity equivalent to that of a 1 to 10 molar solution of caustic soda, maintaining said basicity by introducing to the electrolyte in the vicinity of the anode an alkaline compound of comparable basicity, reacting said sulfide ions with said compound to form alkaline polysulfide, dissolving in said electrolyte the sulfur in the solvent as the latter leaves the anode and flows through said electrolyte, thereby forming additional alkaline polysulfide, removing part of the electrolyte from the anode vicinity of the cell, and recovering said polysulfide from said removed electrolyte.

6. Method of claim 5 wherein the electrolyte comprises an alkaline compound selected from the class consisting of hydroxides and sulfides.

7. Method of claim 6 wherein the polysulfide formed and recovered is a tetrasulfide.

8. In an electrochemical method of oxidizing hydrogen sulfide in a fuel cell to produce electric power wherein said cell has a porous anode immersed in an alkaline anolyte and a cathode immersed in an alkaline catholyte, and wherein free sulfur forms in the anolyte and tends to deposit on said anode, the steps of removing said sulfur from said anode and of recovering sulfur which comprise adding a sulfur solvent to the hydrogen sulfide fuel gas prior to introduction of the latter to the anode, flowing the resulting mixture to the anode for electrochemical oxidation of said gas to produce electric current and coincidently therewith to form sulfur at least a portion of which deposits on said anode, washing the anode by means of said solvent to remove deposited sulfur therefrom, flowing the sulfur-laden solvent into the anolyte, stripping sulfur from the solvent by solution of the sulfur in the anolyte, thereby forming a polysulfide, removing polysulfide-containing anolyte solution from the cell to a sulfur-recovery zone and precipitating sulfur from the polysulfide and recovering said precipitated sulfur.

9. Method of claim 8 wherein the anolyte comprises ammonium hydroxide and wherein ammonium polysulfide is formed in the anolyte solution, precipitating sulfur in the sulfur-recovery zone by heating said anolyte solution, coincidently therewith evolving hydrogen sulfide and ammonia, recovering sulfur from the heated solution, and recirculating the remaining solution and said hydrogen sulfide and ammonia.

10. An electrochemical method of oxidizing hydrogen sulfide in a fuel cell to produce electric power wherein said cell has a porous fuel electrode and an oxygen electrode in contact with an alkaline electrolyte, that portion of the electrolyte in which the fuel electrode is immersed being hereafter referred to as anolyte, which comprises introducing to the fuel electrode hydrogen sulfide and a liquid phase sulfur solvent while coincidently introducing to the oxygen electrode an oxidant, maintaining said fuel electrode and anolyte at a temperature in the range of room to about 180° C. and a pressure sufficient to maintain the anolyte in liquid phase, selectively electrochemically reacting the hydrogen sulfide at the fuel electrode to produce electric current and free sulfur which tends to deposit on external surfaces of the fuel electrode, said solvent having a boiling point just below the temperature of said fuel electrode and anolyte and being heated by contact with the fuel electrode so that the solvent boils off from external surfaces thereof into the anolyte, thereby to continuously wash said surfaces to dissolve any free sulfur deposited thereon, dissolving in the anolyte the free sulfur content of said solvent during passage of the latter from said fuel electrode through the anolyte, and removing sulfur-depleted solvent from the cell.

11. An electrochemical method of oxidizing hydrogen sulfide in a fuel cell to produce electric power wherein said cell has a porous fuel electrode and an oxygen electrode in contact with an alkaline electrolyte, that portion of the electrolyte in which the fuel electrode is immersed being hereafter referred to as anolyte, which comprises introducing to the fuel electrode a gas containing at least about 10% of hydrogen sulfide and a liquid phase sulfur solvent while coincidently introducing to the oxygen electrode an oxidant, maintaining said fuel electrode and anolyte at a temperature in the range of room to about 180° C. and a pressure sufficient to maintaiin the anolyte in liquid phase, selectively electrochemically reacting the hydrogen sulfide at the fuel electrode to produce electric current and free sulfur, removing the balance of said gas from the cell, thereby effecting a separation of hydrogen sulfide from the gas coincidently with said electrochemical reaction step, a portion of said free sulfur depositing on external surfaces of the fuel electrode, said solvent having a boiling point just below the temperature of said fuel electrode and anolyte being heated by contact with the fuel electrode so that the solvent boils off from external surfaces thereof into the anolyte, thereby to continuously wash said surfaces to dissolve any free sulfur deposited thereon, dissolving in the anolyte the free sulfur content of said solvent during passage of the latter from said fuel electrode through the anolyte, and removing sulfur-depleted solvent from the cell.

No references cited.

WINSTON A. DOUGLAS, *Primary Examiner.*
H. M. FLOURNOY, *Assistant Examiner.*